(12) United States Patent
Jamadagni et al.

(10) Patent No.: US 9,055,392 B2
(45) Date of Patent: Jun. 9, 2015

(54) METHOD AND APPARATUS OF COMMUNICATING PACKET DATA UNITS IN A WIRELESS NETWORK ENVIRONMENT AND SYSTEM USING THEREOF

(75) Inventors: Satish Nanjunda Swamy Jamadagni, Bangalore (IN); Pradeep Krishnamurthy Hirisave, Bangalore (IN); Sarvesha Anegundi Ganapathi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 13/814,200

(22) PCT Filed: Aug. 3, 2011

(86) PCT No.: PCT/KR2011/005708
§ 371 (c)(1),
(2), (4) Date: Feb. 4, 2013

(87) PCT Pub. No.: WO2012/018225
PCT Pub. Date: Feb. 9, 2012

(65) Prior Publication Data
US 2013/0136064 A1 May 30, 2013

(30) Foreign Application Priority Data
Aug. 3, 2010 (IN) .......................... 2204/CHE/2010

(51) Int. Cl.
*H04W 4/00* (2009.01)
*H04L 29/06* (2006.01)
(Continued)

(52) U.S. Cl.
CPC ............... *H04W 4/005* (2013.01); *H04L 69/26* (2013.01); *H04L 69/03* (2013.01); *H04L 69/10* (2013.01); *H04W 28/065* (2013.01); *H04W 92/14* (2013.01)

(58) Field of Classification Search
CPC ......... H04L 69/03; H04L 69/10; H04L 69/26; H04W 28/065; H04W 4/005; H04W 92/14
USPC .................................................. 370/310, 328
See application file for complete search history.

(56) References Cited

U.S. PATENT DOCUMENTS 6,501,745 B1 * 12/2002 Turina et al. .................. 370/337
6,590,882 B1 7/2003 Fong et al.
(Continued)

FOREIGN PATENT DOCUMENTS

WO 2006/120650 A1 11/2006

OTHER PUBLICATIONS

Guillaume Sebire et al., 3GPP TSG Geran2#47bis, Chairman's Summary, Vienna, Austria, Oct. 19-22, 2010.
(Continued)

*Primary Examiner* — Chi H Pham
*Assistant Examiner* — Robert Lopata
(74) *Attorney, Agent, or Firm* — Jefferson IP Law, LLP (57) ABSTRACT

A method and system for communicating packet data units over a Gb interface in a wireless communication environment is provided. Packed Data Units (PDUs) are received from Machine Type Communication (MTC) device(s) by a base station coupled to the MTC device(s). Then, the PDUs are aggregated over a period of time by the base station. Further, the aggregated PDUs are packed in at least one Logical Link Control (LLC) data packet. The at least one LLC data packet including the aggregated PDUs is multiplexed over a Gb interface in a single session between the base station and a packet core network.

18 Claims, 7 Drawing Sheets

(51) Int. Cl.
*H04W 28/06* (2009.01)
*H04W 92/14* (2009.01)

(56) References Cited

U.S. PATENT DOCUMENTS

| | | | |
|---|---|---|---|
| 6,661,782 B1* | 12/2003 | Mustajarvi et al. | 370/331 |
| 6,665,280 B2* | 12/2003 | Forssell et al. | 370/329 |
| 6,671,287 B1* | 12/2003 | Huttunen et al. | 370/469 |
| 7,054,283 B2* | 5/2006 | Carlsson et al. | 370/328 |
| 7,145,896 B1 | 12/2006 | Sebire | |
| 7,321,574 B2* | 1/2008 | Anttila | 370/328 |
| 7,444,136 B1* | 10/2008 | Gazzard | 455/414.1 |
| 8,369,273 B2* | 2/2013 | Schliwa-Bertling et al. | 370/329 |
| 8,483,133 B2* | 7/2013 | Navratil et al. | 370/328 |
| 8,614,948 B2* | 12/2013 | Yang | 370/235 |
| 2003/0002455 A1 | 1/2003 | Kularatna et al. | |
| 2005/0053066 A1 | 3/2005 | Famolari | |
| 2005/0096063 A1* | 5/2005 | Muniere | 455/452.2 |
| 2005/0135293 A1* | 6/2005 | Anttila | 370/328 |
| 2005/0271034 A1* | 12/2005 | Asokan et al. | 370/349 |
| 2009/0323646 A1 | 12/2009 | Ketchum et al. | |
| 2010/0014477 A1* | 1/2010 | Schliwa-Bertling et al. | 370/329 |
| 2011/0264740 A1* | 10/2011 | Diachina et al. | 709/204 |
| 2011/0274042 A1* | 11/2011 | Diachina et al. | 370/328 |

OTHER PUBLICATIONS

Digital cellular telecommunications system (Phase 2+); General Packet Radio Service (GPRS); Mobile Station (MS)-Base Station System (BSS) interface; Radio Link Control/Medium Access Control (RLC/MAC) (3GPP TS 44.060 version 11.2.1 Release 11), ETSI TS 144 060 v11.2.1, Oct. 2012.

GP-101886, "Overload control over the Gb interface", Nov. 17, 2010.

S2-10094_Group Bearer, "The group bearer for MTC", Jan. 12, 2010.

GP-100886, "MTC Device Bandwidth Optimization", May 12, 2010.

* cited by examiner

METHOD AND APPARATUS OF COMMUNICATING PACKET DATA UNITS IN A WIRELESS NETWORK ENVIRONMENT AND SYSTEM USING THEREOF

PRIORITY

This application is a National Stage application under 35 U.S.C. §371 of an International application filed on Aug. 3, 2011 and assigned application No. PCT/KR2011/005708, and claims the benefit under 35 U.S.C. §365(b) of a Indian patent application filed on Aug. 3, 2010 in the Korean Intellectual Property Office and assigned Serial No. 2204/CHE/2010, the entire disclosure of which is hereby incorporated by reference.

BACKGROUND OF THE INVENTION

1. Field of the Invention

The present invention relates to the field of wireless communication. More particularly the present invention relates to the field of communicating packet data units over a Gb interface in a wireless network environment.

2. Description of the Related Art

Global System for Mobile communications (GSM) Enhanced Data rates for GSM Evolution (EDGE) Radio Access Network (GERAN) is a type of a wireless network that supports legacy devices as well as Machine-Type Communication (MTC) devices to communicate Packet Switched (PS) data with a core network or a MTC server via a base station. Typically, in GERAN, a base station communicates the PS data with the core network via a Gb interface and vice versa. In other words, peer-to-peer communication between the base station and the core network is performed using a Gb interface. Basically, the peer-to-peer communication across the Gb interface is performed over virtual connections established between remote entities of the base station and the core network.

Machine-to-Machine (M2M) communication (also referred to as "Machine-Type Communication" or "MTC") is a form of data communication between devices that do not necessarily need human interaction (commonly known as MTC devices) unlike legacy devices. For example, in an M2M communication, a MTC device (such as a sensor or smart-meter) may capture an event data which is then relayed through a base station to an application residing in a MTC server for analysis and necessary action. M2M communication may be used in a variety of areas such as smart metering systems (e.g., in applications related to power, gas, water, heating, grid control, and industrial metering), surveillance systems, order management, gaming machines, and health care communication. Additionally, M2M communication based on MTC technology may be used in areas such as customer service.

Typically in GERAN, each base station communicates the PS data received from the legacy devices and the MTC devices with the core network over the Gb interface in a Logical Link Control (LLC) data packet. For example, a Packet Data Unit (PDU) received from a MTC device may contain small burst of PS data (e.g., 20 bytes). On the other hand, a PDU received from a legacy device may contain a large burst of PS data (e.g., up to 1560 bytes). The base station establishes separate sessions across the Gb interface and transmits the LLC data packet containing the PDU over the separate sessions. However, there may be a large number of MTC devices communicating small sized PDUs (in the range of 20 bytes) to the base station at a given instance, whereby each of the small sized PDUs is communicated across the Gb interface using a separate session. This may result in inefficient utilization of capacity of the Gb interface.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and system for communicating Packet Data Units (PDUs) over a Gb interface in a wireless network environment.

In accordance with one aspect of the present invention, a method of transmitting PDUs over a Gb interface in a wireless network environment is provided. The method includes aggregating PDUs associated with one or more Machine Type Communication (MTC) devices. Furthermore, the method includes packing the aggregated PDUs associated with the one or more MTC devices into at least one Logical Link Control (LLC) data packet. Moreover, the method includes multiplexing the at least one LLC data packet containing the aggregated PDUs over a Gb interface in a single session between.

In accordance with another aspect of the present invention, an apparatus is provided. The apparatus includes a processor, and memory coupled to the processor, where the memory is configured to temporarily store instructions, that when executed by the processor, cause the processor to perform a method described above.

In accordance with yet another aspect of the present invention, a system is provided. The system includes a plurality of MTC devices, a plurality of legacy devices, at least one base station coupled to the plurality of MTC devices and the plurality of legacy devices, and a packet core network connected the at least one base station through a Gb interface. The base station is configured for aggregating PDUs received from one or more MTC devices. The base station is also configured for packing the aggregated PDUs associated with the one or more MTC devices into at least one LLC data packet. Moreover, the base station is configured for multiplexing the at least one LLC data packet containing the aggregated PDUs over the Gb interface in a single session between the at least one base station and the packet core network.

Other aspects, advantages, and salient features of the exemplary embodiments will be apparent from the accompanying drawings and from the detailed description that follows.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. Accordingly, those of ordinary skill in the art will recognize that various changes and modifications of the embodiments described herein can be made without departing from the spirit and scope of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
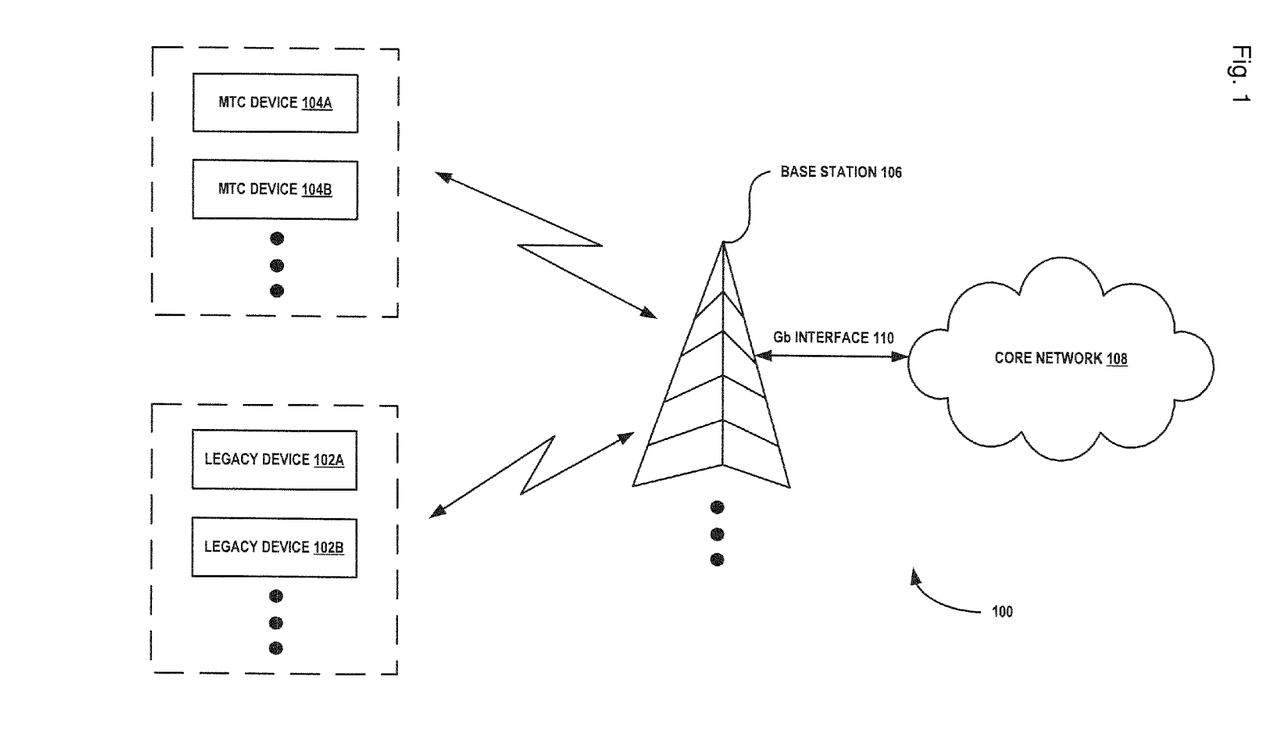
FIG. 1 is a block diagram of a wireless network environment according to an exemplary embodiment of the present invention.

FIG. 1 illustrates a block diagram of a wireless network environment according to one exemplary embodiment of the present invention.

Referring to FIG. 1, the wireless network environment 100 includes legacy devices 102A-N, Machine Type Communication (MTC) devices 104A-N, base stations 106, and a packet core network 108.

The legacy devices 102A-N may include cell phones, laptops, personal computers, and other devices. The MTC devices 104A-N may include devices implemented in smart metering systems (e.g., in applications related to power, gas, water, heating, grid control, and industrial metering), surveillance systems, order management, gaming machines, health care communication systems and the like capable of machine-to-machine communication. The base station and the packet core network 108 are communicatively coupled via a Gb interface 110.

The wireless network environment 100 may enable communication between entities based on Global System for Mobile communications (GSM) Enhanced Data rates for GSM Evolution (EDGE) Radio Access Network (GERAN) or any other wireless network technology which supports the legacy devices 102A-N and the MTC devices 104A-N to communicate with the core network 108 via the base station 106. For the purpose of illustration, exemplary embodiments of the present invention are described with reference to GERAN.

In the wireless network environment 100, the legacy devices 102A-N and the MTC devices 104A-N transmit Packet Data Units (PDUs) to the packet core network 108 via the base station 106. Also, the legacy devices 102A-N and the MTC devices 104A-N receive PDUs from the packet core network 108 via the base station 106. In the above cases, the base station 106 and the packet core network 108 communicates PDUs across the Gb interface 110. The Gb interface 110 enables the base station 106 and the packet core network 108 to communicate PDUs in one or more sessions.

The present exemplary embodiment enables efficient transfer of PDUs associated with one or more MTC devices 104A-N over the Gb interface 110. The below description is described with reference to the base station 106 efficiently communicating PDUs received from the MTC devices 104A-N with the packet core network 108 over the Gb interface 110 in a single session between the base station 106 and the packet core network 108 in uplink.

Consider that, the base station 106 receives one or more PDUs containing Packet Switched (PS) data from the MTC devices 104A-N (e.g., a sensor or smart-meter). For example, the MTC devices 104A-N may capture an event data associated with an event and relay the event data to the base station 106 for communicating with an application residing in a MTC server. In an exemplary operation, the base station 106 stores the PDUs in memory (not shown) received from the MTC devices 104A-N for a period of time. For example, the base station 106 may receive PDUs from MTC devices 104A-N belonging to a single group. In such a case, the base station 106 deliberately aggregates the received PDUs based on a group identifier of said single group until all the MTC devices 104A-N in the group have successfully transmitted PDUs. It can be noted that, a single MTC device 104A may send a plurality of PDUs to the base station 106 which deliberately aggregates the PDUs received from the MTC device 104A.

Figure 3:
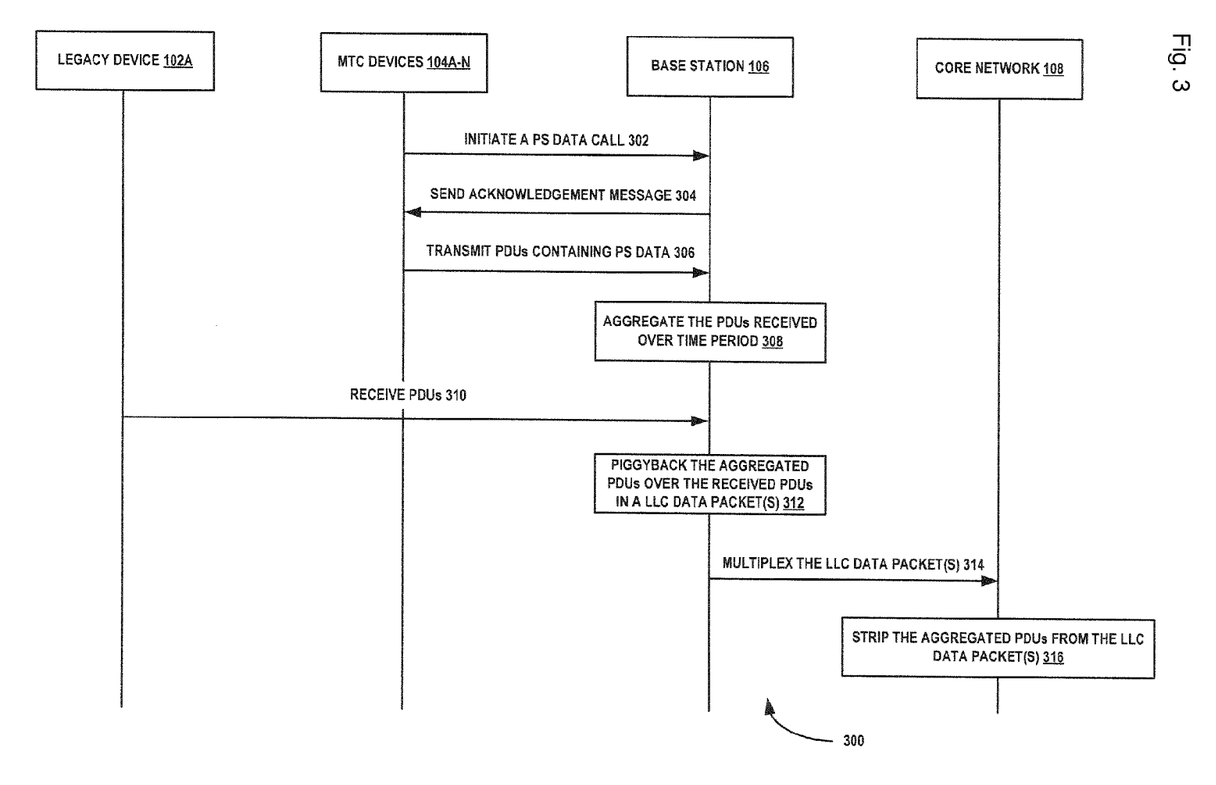
FIG. 3 is a flow diagram illustrating a method of communicating aggregated PDUs associated with MTC devices in a LLC frame over a Gb interface according to another exemplary embodiment of the present invention.
Figure 5:
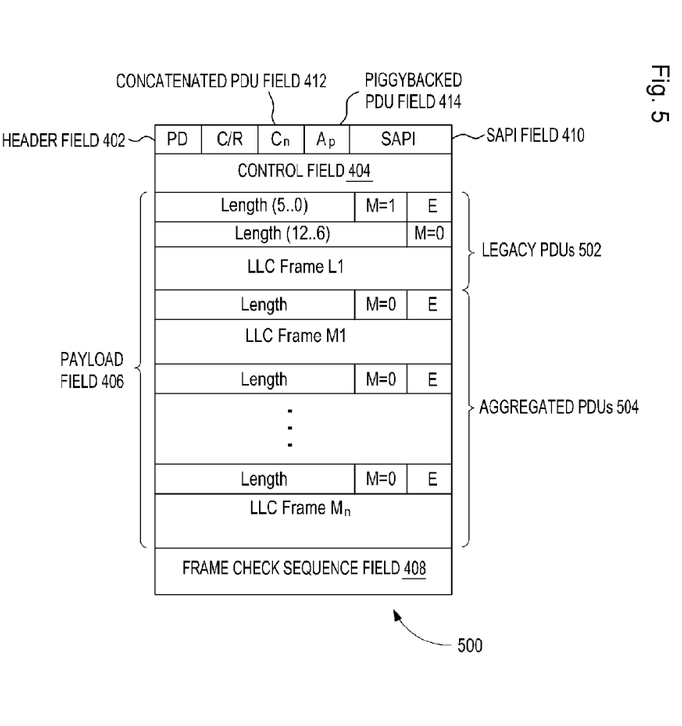
FIG. 5 is a schematic representation illustrating a LLC data packet format according another exemplary embodiment of the present invention.

Then, the base station 106 packs the aggregated PDUs received from the MTC devices 104A-N in a Logical Link Control (LLC) data packet(s). In one exemplary embodiment, the base station 106 concatenates the aggregated PDUs associated with the MTC devices in a new LLC data packet(s) based on a predefined criterion. The predefined criterion may be based on a group identifier associated with the MTC devices 104A-N, load condition, time period, priority of the aggregated PDUs, and so on. In another exemplary embodiment, the base station 106 packs the aggregated PDUs with one or more PDUs received from one or more legacy devices 102A-N in a LLC data packet. For example, the aggregated PDUs are piggybacked over the one or more PDUs associated with the one or more legacy devices 102A-N in the LLC data packet. According to the present exemplary embodiment, the LLC data packet carries an indication whether the LLC data packet includes aggregated PDUs and whether the aggregated PDUs are concatenated or piggybacked. Exemplary LLC data packets showing such indications are illustrated in FIGS. 3 and 5.

The base station 106 multiplexes the LLC data packet(s) carrying the aggregated PDUs over the Gb interface 110 in a single session between the base station 106 and the packet core network 108. Accordingly, the packet core network 108, upon receiving the LLC data packet(s) via the single session, strips the aggregated PDUs from the LLC data packets for processing the PS data in the striped PDUs. Although, the above description describes the base station 106 efficiently transferring the aggregated PDUs to the packet core network 108 over the Gb interface 110, the packet core network 108 may perform the above described steps for efficiently transmitting the PDUs intended from the MTC devices 104A-N to the base station 106 in a LLC data packet(s) over the Gb interface 110 during downlink transmission.

Figure 2:
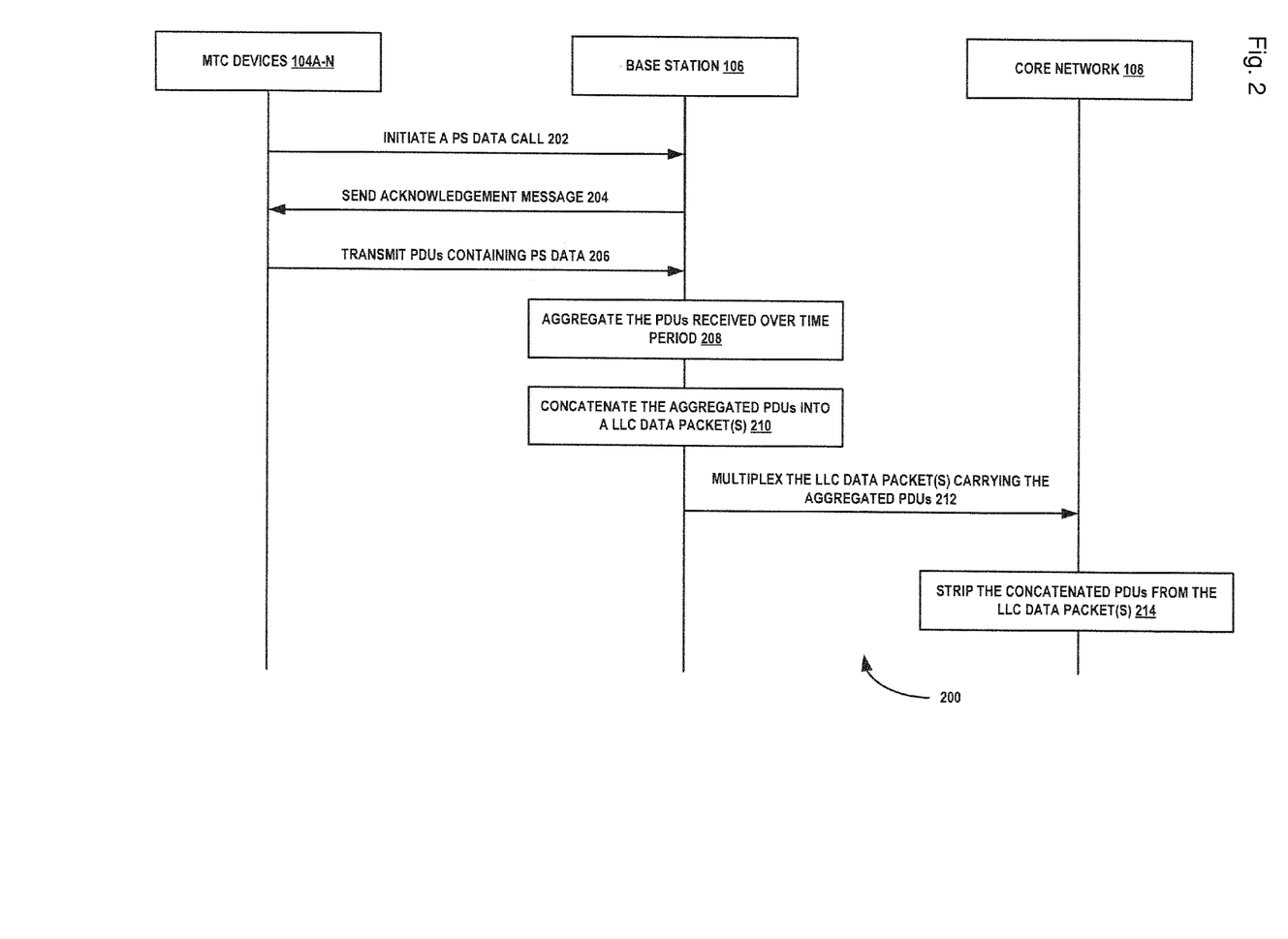
FIG. 2 is a flow diagram illustrating a method of communicating aggregated Packet Data Units (PDUs) associated with Machine Type Communication (MTC) devices in a Logical Link Control (LLC) frame over a Gb interface according to an exemplary embodiment of the present invention.

FIG. 2 is a flow diagram illustrating a method of communicating aggregated PDUs associated with MTC devices in a LLC frame over a Gb interface according to an exemplary embodiment of the present invention.

Referring to FIG. 2, at step 202, one of the MTC devices 104A-N initiates a PS data call with the base station 106. The PS data call may be initiated by sending a service request message to the base station 106. The service request message may indicate that the MTC devices 104A-N intends to communicate PS data with the packet core network 108 during the PS data call.

At step 204, the base station 106 sends an acknowledgement message in response to initiation of the PS data call. At step 206, each of the MTC devices 104A-N transmits PDUs containing PS data to the base station 106. At step 208, the base station 106 aggregates the PDUs received from the MTC devices 104A-N for a predefined time period. The predefined time period may be communicated by one of the MTC devices 104A-N in response to the acknowledgment message or determined by the base station 106.

At step 210, the base station 106 concatenates the aggregated PDUs into a LLC data packet based on the predefined criterion (e.g., group identifier, time period, load condition, priority of PDUs, etc.). At step 212, the base station 106 multiplexes the LLC data packet(s) which carries the concatenated PDUs over the Gb interface 110 in a single session between the base station 106 and the packet core network 108. At step 214, the packet core network 108 stripes the concatenated PDUs from the LLC data packet(s) for further processing of the PS data.

FIG. 3 is a flow diagram illustrating a method of communicating aggregated PDUs associated with MTC devices in a LLC frame over a Gb interface according to another exemplary embodiment of the present invention.

Referring to FIG. 3, at step 302, one of the MTC devices 104A-N initiates a PS data call with the base station 106. At step 304, the base station 106 sends an acknowledgement message in response to initiation of the PS data call. At step 306, each of the MTC devices 104A-N transmits PDUs containing PS data to the base station 106. At step 308, the base station 106 aggregates the PDUs received from the MTC devices 104A-N for a predefined time period. The predefined time period may be communicated by one of the MTC devices 104A-N in response to the acknowledgment message or determined by the base station 106.

Also, at step 310, the base station 106 receives PDUs from a legacy device (e.g., a legacy device 102A) for communicating with the packet core network 108. The base station 106 may receive the PDUs from the legacy device 102A substantially simultaneously to the reception of PDUs from the MTC devices 104A-N.

At step 312, the base station 106 piggybacks the aggregated PDUs together with the PDUs of the legacy device 102A into a LLC data packet(s). At step 314, the base station 106 multiplexes the LLC data packet(s) which carries the aggregated PDUs piggybacked with the PDUs of the legacy device 102A over the Gb interface 110 in a single session between the base station 106 and the packet core network 108. At step 316, the packet core network 108 stripes the aggregated PDUs in the LLC data packet(s) for further processing of the PS data.

Figure 4:
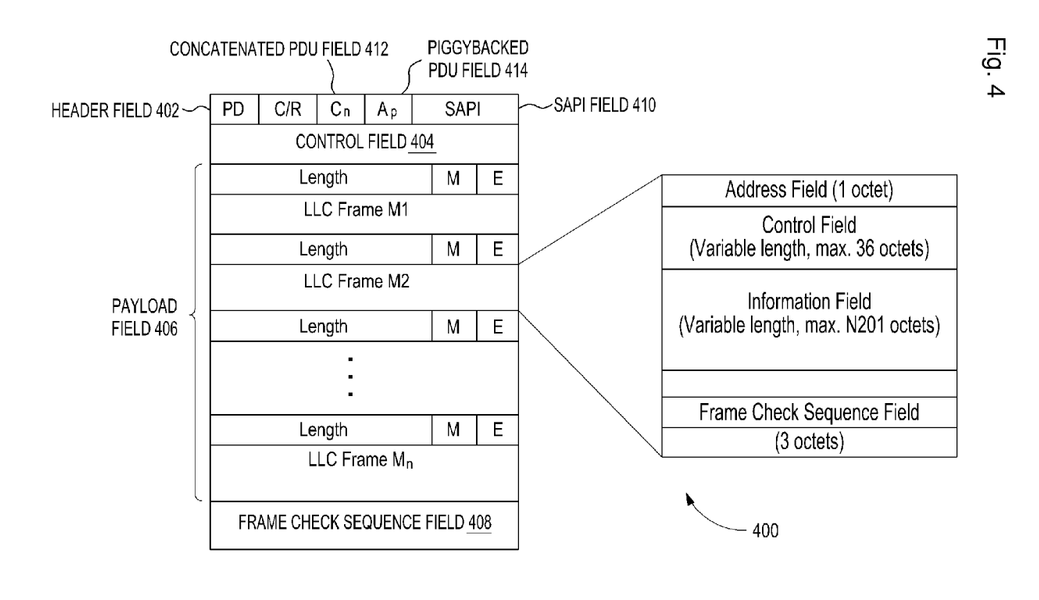
FIG. 4 is a schematic representation illustrating a LLC data packet format according an exemplary embodiment of the present invention.

FIG. 4 is a schematic representation illustrating a LLC data packet format according an exemplary embodiment of the present invention.

Referring to FIG. 4, the LLC data packet 400, which carries the concatenated PDUs associated with the MTC devices 104A-N, includes a header field 402, a control field 404, a payload field 406, and a frame check sequence field 408. According to the present exemplary embodiment, the header field 402 includes a Service Access Point Identifier (SAPI) field 410, a concatenated PDU field 412, and a piggybacked PDU field 414.

The SAPI field 410 indicates presence of aggregated PDUs in the LLC data packet 400. The concatenated PDU field 412 indicates the presence of the aggregated PDUs concatenated in the LLC data packet 400. The piggybacked PDU field 414 indicates presence of aggregated PDUs piggybacking one or more PDUs associated with the legacy devices 102A-N. The payload field 406 includes LLC frames M1-Mn carrying the aggregated PDUs associated with the MTC devices 104A-N. In the exemplary embodiment illustrated in FIG. 4, the LLC data packet 400 contains concatenated PDUs associated with the MTC devices 104A-N. Hence, the concatenated PDU field 412 is set to '1' and the piggybacked PDU field is set to '0'.

FIG. 5 is a schematic representation illustrating a LLC data packet format according another exemplary embodiment of the present invention.

Referring to FIG. 5, the LLC data packet 500 is same as the LLC data packet 400 of FIG. 4, except the payload field 406 includes the aggregated PDUs 504 piggybacked over the PDUs 502 of the legacy devices 102A-N. Thus, in the LLC data packet 500, the piggybacked PDU field 414 is set to '1' while the concatenated PDU field 412 is set to '0'.

Figure 6:
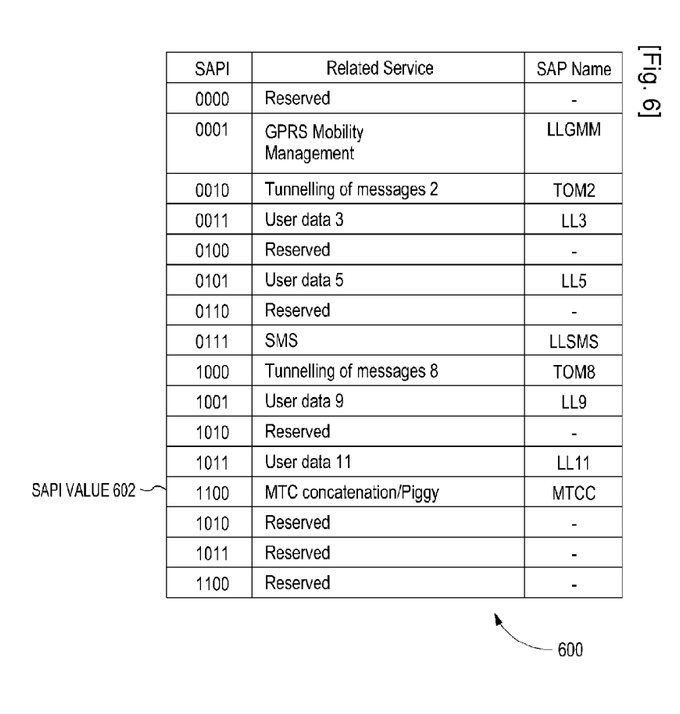
FIG. 6 is a tabular representation illustrating a Service Access Point Identifier (SAPI) value indicating presence of aggregated PDUs in a LLC data packet according to an exemplary embodiment of the present invention.

FIG. 6 is a tabular representation illustrating a SAPI value indicating presence of aggregated PDUs in a LLC data packet according to an exemplary embodiment of the present invention.

Referring to FIG. 6, when the LLC data packet 400 includes aggregated PDUs associated with the MTC devices 104A-N, the SAPI field 410 is set to an appropriate SAPI 602 as illustrated in the tabular representation 600. The SAPI value '1100' indicates that the LLC data packet 400 includes aggregated PDUs associated with the MTC devices 104A-N. Other SAPI values illustrated in the tabular representation are well known to the person skilled in the art and explanation is thereof omitted.

Figure 7:
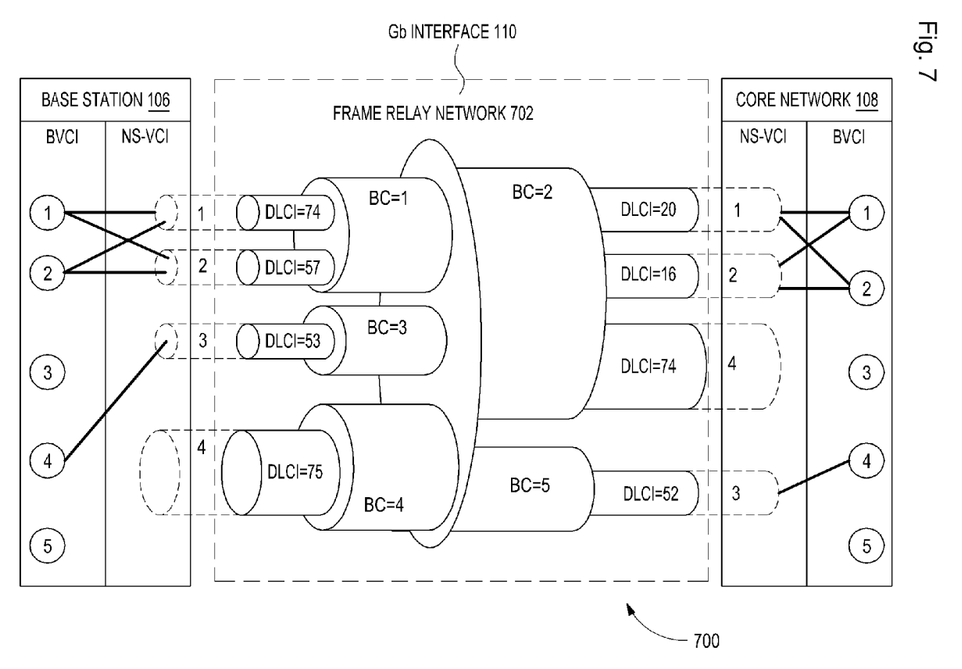
FIG. 7 is a schematic diagram representing a Gb interface connection between a base station and a packet core network according to an exemplary embodiment of the present invention.

FIG. 7 is a schematic diagram representing a Gb interface connection between a base station and a packet core network according to an exemplary embodiment of the present invention.

Referring to FIG. 7, the Gb interface 110 is a link between the base station 106 and the packet core network 108 which enables transport of GPRS Mobility Management (GMM), Packet Flow Management (PFM), Network Management (NM) signaling data and PDUs from the legacy devices 102A-N and MTC devices 104A-N. The base station 106 and the packet core network 108 is connected directly via a physical link (e.g., frame relay link) or indirectly through cascading links in a frame relay network 702 as shown in FIG. 7. As illustrated, the frame relay network 702 consists of one or more multiple bearer channels. A bearer channel is a physical channel that carries GMM, PFM, NM signaling data and LLC data packets. For example, a bearer channel can be nx64 Kbps channel on a Pulse Code Modulation (PCM) link. A PCM link is a transmission link typically used in telecommunication networks. It can be noted that, since the bearer channel can be mapped on restriction of a PCM link, the PCM link can be shared between the Gb interface and an A interface. A bearer channel can support several Permanent Virtual Circuits (PVCs). It is appreciated that, a PVC allows multiplexing of multiple virtual flows associated with different user applications on the bearer channel.

Each bearer channel supports one or more Network Service Virtual Links (NS-VLs). A NS-VL identifies a link defined by the PVC and its supporting bearer channel. It is appreciated that, each NS-VL is supported by a physical link and several NS-VLs can be mapped on a physical link. As illustrated, one NS Virtual Link Identifier (VLI) corresponds to the association of Data-Link Connection Identifier (DLCI) and a Bearer Channel Identifier (BCI).

The NS-VLs are connected to construct an end-to-end virtual path between the base station 106 and the packet core network 108. The virtual path is known as Network Service Virtual Connection (NS-VC). The peer-to-peer communication across the Gb interface 110 between the base station 106 and the packet core network 108 is performed over end-to-end NS-VCs (also referred as sessions in the foregoing description). The Network Service (NS) layer at the base station 106 and the packet core network 108 is responsible for management of the multiple NS-VCs between the base station 106 and the packet core network 108. The NS layer is responsible for management of multiple NS-VCs between the base station 106 and the packet core network 108. For example, the NS layer verifies availability of NS-VCs, and initializes or restores possible NS-VCs. The NS layer also ensures efficient distribution of upper-layer LLC data packets between different possible NS-VCs.

A BSSGP layer (not shown) at the base station 106 is operable for transmitting LLC data packets containing aggregated PDUs associated with the MTC devices 104A-N and/or PDUs associated with the legacy devices 102A-N over one or more NS-VCs. For example, the data traffic addressed to cell 1 or cell 2 from the packet core network 108 or received in the cell 1 or cell 2 in the base station 106 is transferred on corresponding Bundled Virtual Connections (BVC) at the BSSGP layer. It can be noted that, a BVC is supported by a group of NS-VCs. BVCs provide communication paths between BSSGP entities at the base station 106 and the packet core network 108.

According to one or more exemplary embodiments of the present invention, the BSSGP layer at the base station 106 configured for packing the aggregated PDUs in a LLC data packet and multiplexing the LLC packet containing the aggregated PDUs over a NS-VC. The BSSGP layer at the packet core network 108 is operable for striping the aggregated PDUs from the LLC data packet received over the NS-VC (e.g., identified through a NS-VCI associated with the NS-VC).

Figure 8:
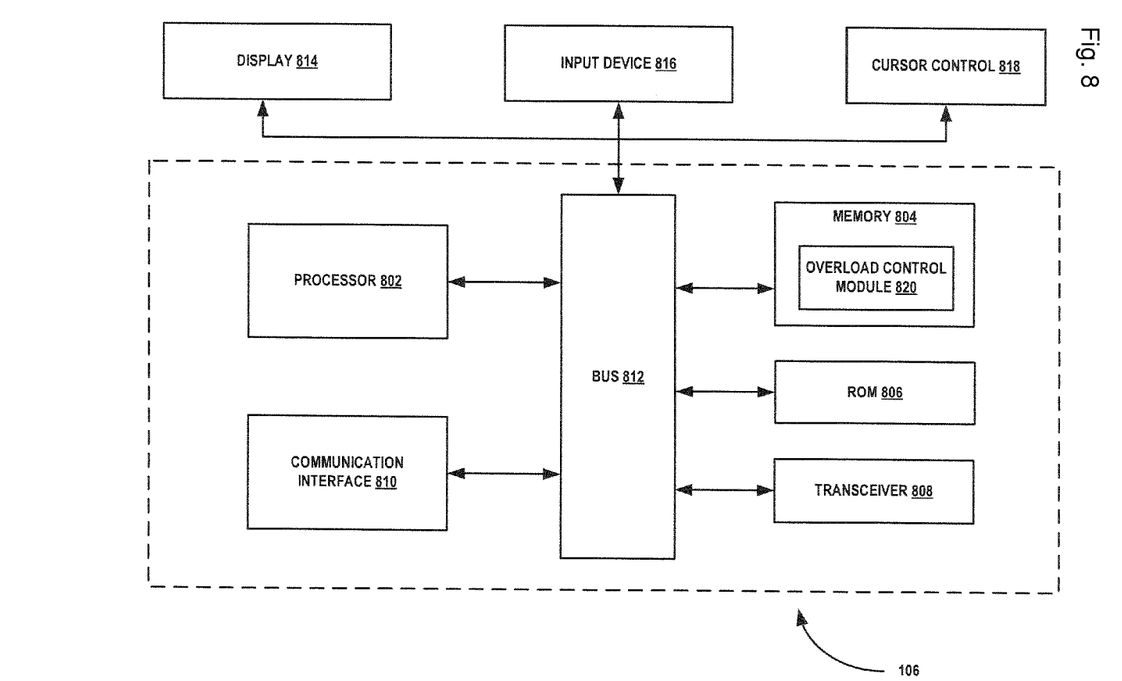
FIG. 8 is a block diagram of a base station showing according to an exemplary embodiment of the present invention.

FIG. 8 is a block diagram of a base station according to an exemplary embodiment of the present invention.

Referring to FIG. 8, the base station 106 includes a processor 802, memory 804, a Read Only Memory (ROM) 806, a transceiver 808, a bus 812, a communication interface 810, a display 814, an input device 816, and a cursor control 818.

The processor 802, as used herein, denotes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 802 may also include embedded controllers, such as generic or programmable logic devices or arrays, application specific integrated circuits, single-chip computers, smart cards, and the like.

The memory 804 and the ROM 806 may be volatile memory and non-volatile memory. The memory 804 includes an overload control module 820 for efficiently communicating PDUs over the Gb interface 110, according to one or more exemplary embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, diskettes, magnetic tape cartridges, memory cards, Memory Sticks™, and the like.

Exemplary embodiments of the present invention may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 802. For example, a computer program may include machine-readable instructions capable of efficiently communicating PDUs over the Gb interface 110, according to the teachings and herein described exemplary embodiments of the present disclosure. In one exemplary embodiment, the program may be included on a Compact Disk-Read Only Memory (CD-ROM) and loaded from the CD-ROM to a hard drive in the non-volatile memory. The machine-readable instructions may cause the base station 106 to encode according to the various exemplary embodiments of the present subject matter.

The transceiver 808 may be capable of receiving PDUs from legacy devices 102A-N and MTC devices 104A-N and communicating the PDUs in the LLC data packet(s) over the Gb interface 110. The bus 812 acts as interconnect between various components of the base station 106. The components such as communication interfaces 810, the display 814, the input device 816, and the cursor control 818 are well known to the person skilled in the art and hence the explanation is thereof omitted.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method of transmitting packet data units (PDUs) by a base station in a wireless network system, the method comprising:

aggregating PDUs received from one or more machine type communication (MTC) devices;

packing the aggregated PDUs into at least one logical link control (LLC) data packet; and transmitting, to a network, the at least one LLC data packet in a single session, wherein the at least one LLC data packet comprises a first field indicating that the at least one LLC data packet contains the aggregated PDUs.

2. The method of claim 1, wherein the PDUs received from the one or more MTC devices comprise packet switched (PS) data.

3. The method of claim 1, wherein the PDUs received from the one or more MTC devices are aggregated if a service request message for data transmission and reception with the network is received from the one or more MTC devices.

4. The method of claim 1, wherein the aggregated PDUs are included in the at least one LLC data packet based on a predefined criterion.

5. The method of claim 1, wherein the aggregated PDUs are concatenated into the at least one LLC data packet based on a predefined criterion, wherein the predefined criterion is based on at least one of a group identifier related to the one or more MTC devices, a priority related to the PDUs, a load condition related to an interface for communication between the base station and the network, and a predetermined time period.

6. The method of claim 1, wherein the aggregated PDUs are piggybacked with one or more PDUs received from at least one legacy device into the at least one LLC data packet.

7. The method of claim 1, wherein the single session is based on a network service virtual connection.

8. The method of claim 1, wherein the at least one LLC data packet further comprises a second field indicating concatenation of the aggregated PDUs in the at least one LLC data packet.

9. The method of claim 1, wherein the at least one LLC data packet further comprises a third field indicating that the aggregated PDUs are piggybacked over one or more PDUs received from at least one legacy device.

10. A base station of transmitting packet data units (PDUs) in a wireless network system, the base station comprising:

a processor configured to aggregate PDUs received from one or more machine type communication (MTC) devices, and to pack the aggregated PDUs into at least one logical link control (LLC) data packet; and a transceiver configured to transmit the at least one LLC data packet in a single session to a network, wherein the at least one LLC data packet comprises a first field indicating that the at least one LLC data packet contains the aggregated PDUs.

11. The base station of claim 10, wherein the PDUs received from the one or more MTC devices comprise packet switched (PS) data.

12. The base station of claim 10, wherein the PDUs received from the one or more MTC devices are aggregated if a service request message for data transmission and reception with the network is received from the one or more MTC devices.

13. The base station of claim 10, wherein the aggregated PDUs are included in the at least one LLC data packet based on a predefined criterion.

14. The base station of claim 10, wherein the aggregated PDUs are concatenated into the at least one LLC data packet based on a predefined criterion, wherein the predefined criterion is based on at least one of a group identifier related to the one or more MTC devices, a priority related to the PDUs, a load condition related to an interface for communication between the base station and the network, and a predetermined time period.

15. The base station of claim 10, wherein the aggregated PDUs are piggybacked with one or more PDUs received from at least one legacy device into the at least one LLC data packet.

16. The base station of claim 10, wherein the single session is based on a network service virtual connection.

17. The base station of claim 10, wherein the at least one LLC data packet further comprises a second field indicating concatenation of the aggregated PDUs in the at least one LLC data packet.

18. The base station of claim 10, wherein the at least one LLC data packet further comprises a third field indicating that the aggregated PDUs are piggybacked over one or more PDUs received from at least one legacy device.

* * * * *